Sept. 5, 1933.  W. C. MAYNARD  1,925,197
LURE
Filed Oct. 26, 1932
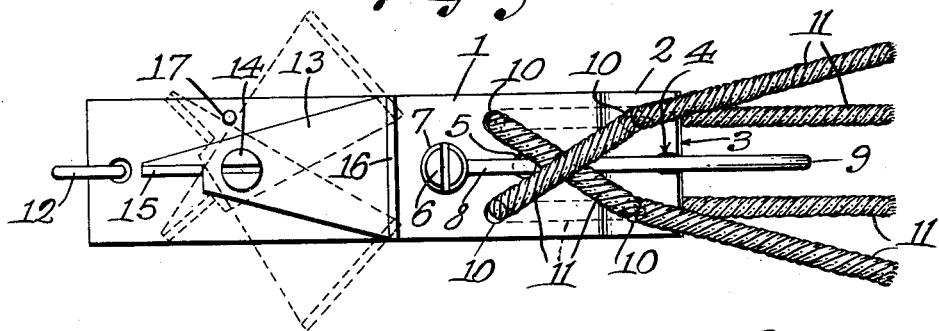
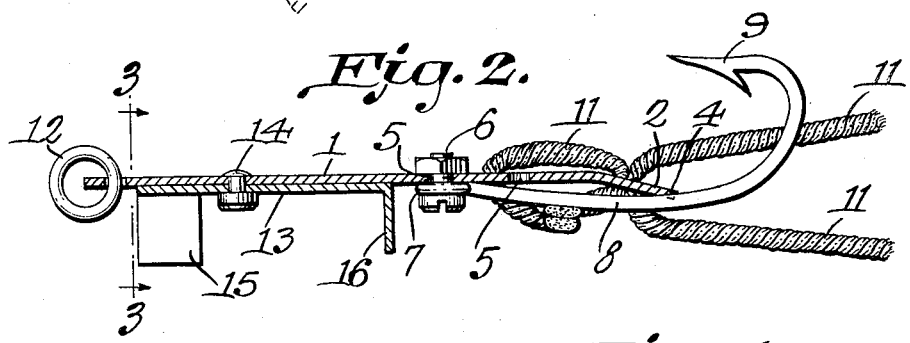
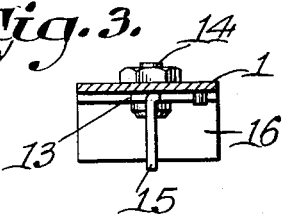
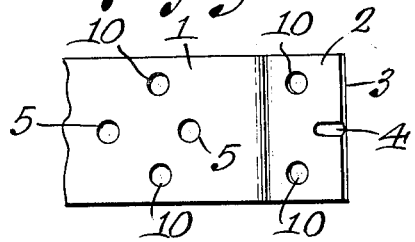
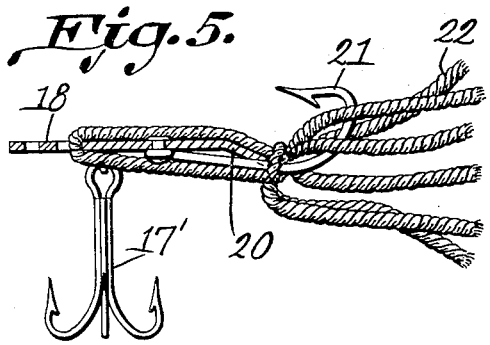
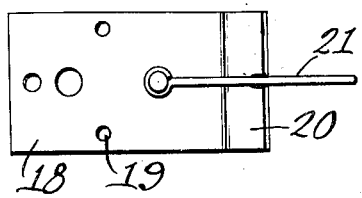
William C. Maynard, Inventor
Attorneys.

Patented Sept. 5, 1933

1,925,197

UNITED STATES PATENT OFFICE 1,925,197

LURE

William C. Maynard, Coral Gables, Fla.

Application October 26, 1932. Serial No. 639,687

3 Claims. (Cl. 43—42)

This invention relates to lures for either salt water or fresh water fishing.

An object of the invention is to form the body thereof of a plate through which can be threaded a colored material for attracting the fish said plate having an inclined end constituting a rest or support for a hook of standard construction whereby the shank of the hook can be held under tension when fastened to the plate, and thus kept in proper position.

Another object is to provide a lure which will have an irregular zigzag and diving motion in the water simulating that of a fish in trouble.

A still further object is to provide a lure so constructed that should its hook become damaged, a new one of standard form can be substituted, thereby avoiding the use of expensive hooks of special form which have been required generally.

A still further object is to provide the lure with a movable rudder arrangement for increasing the eccentric action of the lure in the water.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawing the preferred forms of the invention have been shown.

In said drawing:

Figure 1 is a bottom plan view of the lure.

Figure 2 is a longitudinal section.

Figure 3 is a section on line 3—3, Figure 2.

Figure 4 is a plan view of one end of the plate showing the openings therein.

Figure 5 is a longitudinal section through a modified form of lure.

Figure 6 is a plan view thereof with the colored material removed.

Referring to the figures by characters of reference, 1 designates a flat plate preferably oblong and having its back end bent at an obtuse angle so as to form an offset 2 the transverse rear edge of 3 of which has a central notch or recess 4 constituting a seat.

Openings 5 are formed in the plate along the longitudinal center thereof and any one of them is adapted to receive a bolt or rivet 6. This extends through the eye 7 at one end of the shank 8 of a hook 9. The shank rests in the notch or recess 4 and by tightening the bolt or rivet the eye 7 is pressed snugly against plate 1 while at the same time the shank is placed under tension and will bind tightly on the seat formed by notch 4. Thus the hook, which is extended back of the plate, will be held firmly to the plate and will not become displaced. With this arrangement of parts a standard hook can be used and it is not necessary to employ expensive hooks of special forms. Furthermore by providing more than one opening, hooks with shanks of different lengths can be used.

Apertures 10 are located at desired points in the rear portion of the plate and strands 11 of colored yarn are threaded therethrough and arranged with their free ends located where they will trail alongside the hook and back of the plate.

A closed ring 12 is fitted loosely in the front end of plate 1 for attachment to the line but it is to be understood that other connecting means can be used.

In a large size lure, such as used in salt water fishing, the plate 1 can be provided with a freely movable rudder in the form of a plate 13 pivotally connected between its ends to plate 1 at a point 14 located in front of screw or rivet 6. The front end of the rudder has a longitudinally extended fin 15 perpendicular thereto while depending from the other or back end of the rudder is a transverse fin 16 perpendicular to the plate and at right angles to fin 15. A stop lug 17 is located near one side of the rudder plate for limiting lateral oscillation thereof, as shown by broken lines in Figure 1.

When the lure is submerged the relative movement of the water and lure will cause the offset end 2 to act as a deflector and set up a diving and zigzag movement. In the larger form this movement is accentuated by the freely pivoted rudder plate 13 which will oscillate relative to the plate 1.

In smaller sizes of lures, such as used for fresh water fishing, the rudder need not be used and additional hooks 17' can be suspended from the sides of the plate 18 (see Figs. 5 and 6), openings 19 being provided for that purpose. This smaller form has the offset rear deflecting end 20, the hook 21 fastened as before explained, and the yarn 22 threaded through the plate.

What is claimed is:

1. A lure including a plate, a hook secured thereto, a deflector at one end of the plate, and a rudder upon and mounted to oscillate laterally relative to the plate, said rudder including longitudinal and transverse fins.

2. A lure including a plate, a hook secured thereto, a deflector at one end of the plate, and a rudder upon and mounted to oscillate laterally relative to the plate, said rudder including a plate pivoted between its ends, a longitudinal fin at one end thereof, and a transverse fin at its other end.

3. A lure including a plate, a hook secured thereto, a deflector at one end of the plate, and a rudder upon and mounted to oscillate laterally relative to the plate, said rudder including a plate pivoted between its ends, a longitudinal fin at one end thereof, and a transverse fin at its other end, and a stop for limiting the oscillation of the rudder.

WILLIAM C. MAYNARD.